June 11, 1963   W. E. BOWERS   3,093,419
MORTAR SPREADING APPARATUS AND METHOD OF CONVEYING
Filed March 2, 1960   2 Sheets-Sheet 1
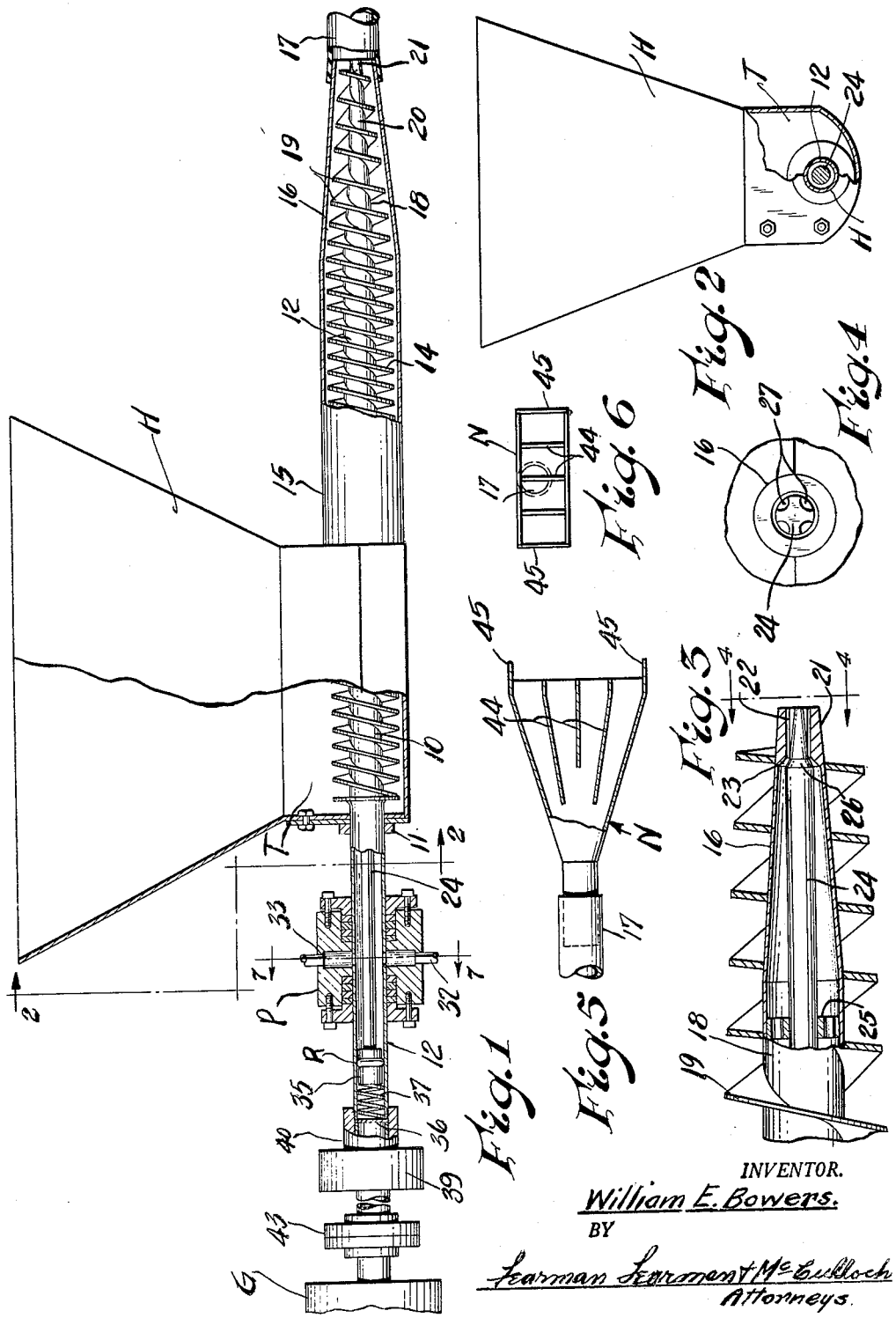
INVENTOR.
William E. Bowers.
BY
Learman Learman & McCulloch
Attorneys.

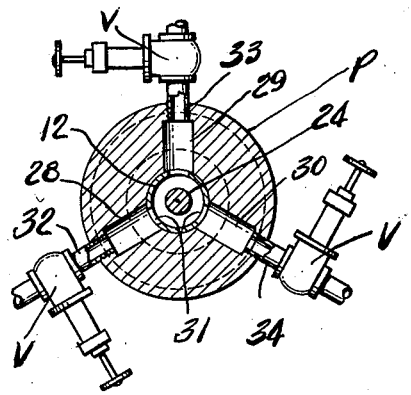
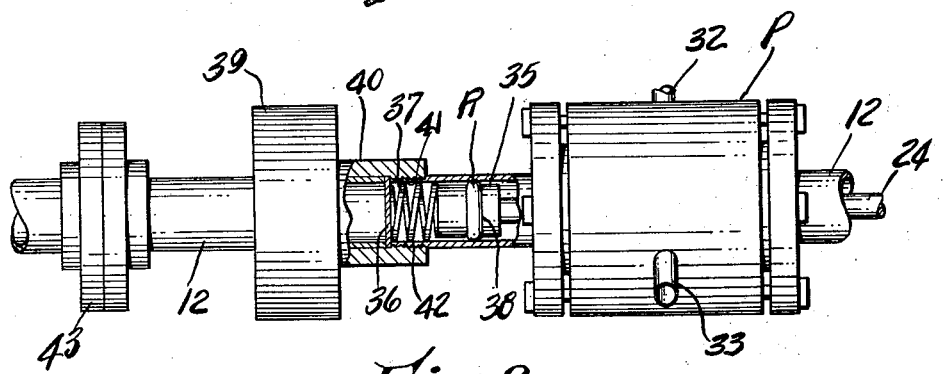
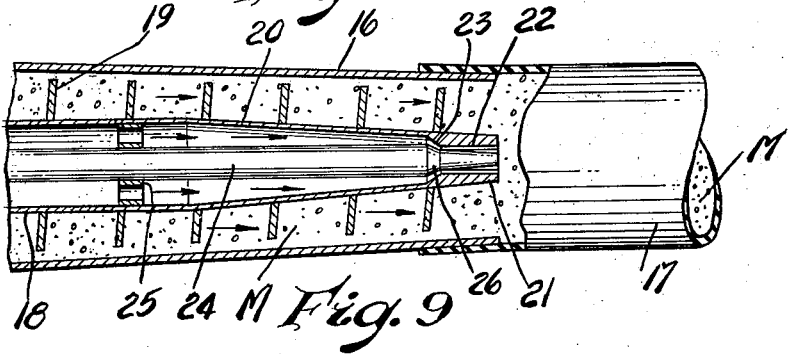
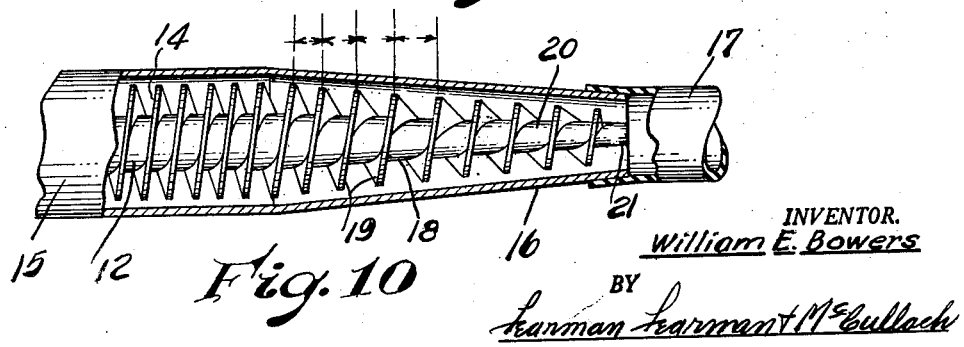

United States Patent Office

3,093,419
Patented June 11, 1963

3,093,419
MORTAR SPREADING APPARATUS AND
METHOD OF CONVEYING
William E. Bowers, 1712 Woodside Ave.,
Bay City, Mich.
Filed Mar. 2, 1960, Ser. No. 12,458
6 Claims. (Cl. 302—50)

This invention relates to an apparatus for conveying and handling finely divided materials, either wet or dry, such as sand, gravel and cement for various purposes; such as grouting machinery and other equipment, filling masonry mortar joints, applying mortar to walls of buildings as the buildings are under construction and forcing said material, by said conveyor or by means of a hydraulic agent, from a hopper apparatus to the point of application.

One of the main objects of the invention is to design an apparatus equipped with conveying means and apparatus, together with pressure means, applicable to the conveyed material, for forcing it, under pressure, into joints and areas remotely removed from the hopper means.

Another object is to provide a conveying and handling apparatus, including a flexible means forming an extension of said conveying apparatus, with pneumatic means associated therewith to force the mixed material from the conveyor to the point of application, and provide a nozzle means on said flexible means to regulate the shape of the mortar stream as it is discharged from the flexible means.

A further object is to design a simple, practical and comparatively inexpensive apparatus by means of which the mortar forming material may be conveyed to a predetermined point, or point of flexible hose connection, and then pressure fed, into desired areas or masonry joints as desired.

A further object still is to design an apparatus including a tapered conveying and valve means, the flights on the end section of said conveyor being spaced progressively further apart to avoid clogging, and to provide means associated with said conveying means for admitting a pressure agent to the conveyed material, which agent can be automatically adjusted as the mechanism is actuated.

Still a further object is to design a handling apparatus including a conveying means having a flexible hose connected thereto with interchangeable nozzles releasably connected to said hose, and a pressure agent in communication with said conveying means and hose for forcing the mixture through the hose after it is discharged from the conveyor for delivery to a designated spot or area.

A further object is to provide a valve or metering means for automatically regulating the volume of the pressure agent admitted to the discharging material.

With the above and other objects in view, the present invention consists in the combination and arrangement of parts, hereinafter more fully described, illustrated in the accompanying drawings, and more particularly pointed out in the appended claims, it being understood that changes may be made in the form, size, proportion, and minor details of construction, without departing from the spirit or sacrificing any of the advantages of the invention.

In the drawings:

FIG. 1 is a fragmentary, part sectional, side elevational view of my material conveying and spreading apparatus.

FIG. 2 is a transverse, sectional view taken on the line 2—2 of FIG. 1.

FIG. 3 is an enlarged, fragmentary, part sectional view of the conveyor, showing the air valve and associated parts.

FIG. 4 is an end elevational view of the mechanism shown in FIG. 3.

FIG. 5 is a part sectional, plan showing a mortar spreading nozzle.

FIG. 6 is an end elevational view of said nozzle.

FIG. 7 is an enlarged, transverse sectional view taken on the line 7—7 of FIG. 1.

FIG. 8 is an enlarged part sectional view showing the thrust collar, spring seating plate and associated parts.

FIG. 9 is an enlarged, fragmentary, part sectional side view showing the outer end of the conveyor trough and valve means, the arrows showing the direction of travel of the air and material.

FIG. 10 is a part sectional side view of the conveyor trough and conveyor illustrating the spacing of the conveyor flights.

In the form as shown in the accompanying drawings, the apparatus comprises generally a hopper H which can be formed of sheet metal or any other material, said hopper opening into and being secured to a semi-cylindrical trough section T, adapted to accommodate a conveyor 10, and bearings 11 are provided on the end walls of the trough-shaped section and serve to support said conveyor. This conveyor is of special design and comprises a sleeve 12 having flights 14 thereon as usual, said conveyor being driven from a suitable driving means (not shown), and a gear box G is provided for regulating the speed of the conveyor in the conventional manner.

A closed, cylindrical, section 15 forms an extension of the hopper trough T, and includes a tapered section 16 to which one end of a flexible hose 17 is connected. The outer end flight section 18 of the conveyor 12 is also tapered to conform to the tapered section 16 of the trough 15 and a nozzle N is connected to the free end of the hose 17 so that the conveyed material M may be deposited at the desired location. The conveyor flights 19 which operate in the tapered trough section 16 are progressively-spaced further apart as indicated in FIG. 10 of the drawing to facilitate the conveying of the mortar M (see FIG. 9), and to avoid clogging.

The end section 20 of the conveyor, which projects beyond the end of the flights 19 is also tapered, the tip end 21 having a concentrically-disposed cylindrical passage 22, the inner end of which is beveled as at 23 to form a valve seat, all as clearly shown in FIG. 3 of the drawings.

An elongated valve shaft or stem 24 is mounted in suitable bearings 25 provided in the conveyor sleeve 12, the outer end of said stem being beveled as at 26 and is fluted as at 27 to form passages to enlarge the pattern of the discharging pressure agent, the beveled section 26 engaging, when in closed position, with the section 23 to close and/or regulate the flow of the pressure agent therethrough.

A conventional packing gland P is mounted on the shank end of the conveyor sleeve 12, and a plurality of circumferentially-disposed passages 28, 29 and 30 are provided in said gland, ports 31 being provided in the sleeve 12, and lines 32, 33 and 34 communicate with said passages for selectively supplying either steam, air, or water, under pressure, to said sleeve, valves V being provided in the individual lines for admitting or closing off the selected medium.

A piston head 35 is provided on the inner end of the shaft 24 within the sleeve 12, and a spring seating plate 36 is provided as shown; a coil spring 37 being interposed between the head of the piston and said plate for exerting outward pressure on the valve shaft at all times, said piston being grooved as at 38 to receive a ring R as usual.

A thrust bearing 39 is mounted on the sleeve 12 as shown and is formed with a tubular extension 40, internally threaded as at 41 to engage the threaded section 42 of sleeve 12.

A coupling 43 is provided on the sleeve 12 adjacent the gear box G and is adapted to be coupled to a similar coupling in the conventional manner.

The lines 32, 33 and 34 are, of course, connected to suitable sources of air, steam, and hydraulic supply and these are manually controlled by manipulation of the valves V in the usual manner.

The hose 17 fits over and is connected to the trough extension 16 in any desired manner, and a flat spreader nozzle N (see FIG. 5) is provided on the free end thereof, said nozzle being fan-shaped as shown, and is provided with a plurality of longitudinally-disposed spaced division plates 44 which divide and spread the mortar stream (not shown) into a wide flat strip. Projecting ears 45 are provided on the side walls of the spreader nozzle N to insure a clean sharp mortar line, and while in the present instance I have shown a flat spreader nozzle, it will be understood that this nozzle can be elliptical, round, or any other desired shape to suit the work to be performed.

In practice, the conveyor is energized from a motor or other driving means (not shown), and the materials to be conveyed are fed into the hopper H, thence being conveyed outwardly towards the tapered end of the conveyor, this portion of the work is thus mechanically performed, and under certain conditions will force the mixed material direct to the nozzle, but with one of the valves V in open position, and connected to a source of steam, air or hydraulic supply, the pressure agent thus admitted to the sleeve 12 will force the mortar outwardly in the hose (which is held by a workman), and fed to the desired spot or area.

Normally the spring pressure on the head of the piston serves to force the beveled section 26 towards the seat 23, and the force of the pressure agent against the opposite end of the piston serves to open the valve.

From the foregoing description, it will be obvious that I have perfected a very simple, practical, and relatively inexpensive apparatus by means of which materials may be conveyed, handled and pressurized.

What I claim is:

1. A conveying system for handling and conveying materials in a finely divided condition comprising a hopper having a horizontally disposed tubular extension terminating in an outwardly tapered outer end section, a driven screw conveyor including a hollow sleeve mounted in said hopper and extension, said tapered outer end section terminating in a reduced longitudinally disposed passage, a longitudinally disposed passage, a longitudinally disposed spring pressed shaft mounted in said sleeve with its outer end extending into said reduced passage and normally forming a valve closure for same, a piston attached to the shaft and slidable in said sleeve member, spring means bearing against the one end of said piston, means for admitting a selected pressure agent to said sleeve at a point intermediate said valve and piston, for discharge through said passage, said shaft being movable inwardly to open said valve and permit passage of the pressure agent when the force of the pressure agent exceeds the spring pressure on said piston.

2. The combination defined in claim 1 in which beveled engaging surfaces are provided on the shaft and inner end of the reduced passage respectively to form a valve for controlling the flow of the pressure agent discharged from said sleeve.

3. The combination as defined in claim 1 in which a packing gland is provided on the conveyor sleeve, and a plurality of lines opening into said packing gland and sleeve respectively for selectively admitting a pressure agent to said sleeve.

4. The combination set forth in claim 1 in which a predetermined number of the conveyor flights at the discharge end of the conveyor are spaced progressively further apart to avoid clogging.

5. A conveying system for mixed materials comprising a hopper having a tubular extension; a screw conveyor revolvably mounted in said hopper and extension and having a hollow sleeve, a valve seat formed in the outer section of said sleeve, an elongated shaft mounted in said sleeve, and provided with a valve thereon for engagement with said valve seat, a piston on the opposite end of the shaft and slidable in said sleeve, a spring in said sleeve bearing against said piston and acting in a closing direction on the valve, and means for introducing a pressure agent to said sleeve at a point intermediate said valve and piston in opposition to said spring.

6. Conveying apparatus comprising a tubular member having a discharge end; means communicating with said member remote from its discharge end for supplying the latter with material to be conveyed; a screw conveyor rotatably mounted in said tubular member, said screw conveyor comprising a hollow sleeve having one of its ends terminating adjacent the discharge end of said member and having a valve seat formed inwardly of its said one end; a valve member movably mounted in said hollow sleeve and having a seating portion inwardly of said one end of said sleeve adapted to seat on said valve seat to close said one end of said sleeve; spring means acting on said valve member and biasing the seating portion of the latter into engagement with said valve seat; and pressure fluid supply means communicating with the interior of said hollow sleeve at a point remote from said one end thereof for supplying fluid to said hollow sleeve under sufficient pressure to overcome the bias of said spring means and displace said valve member inwardly of said one end, thereby opening said one end of said sleeve.

References Cited in the file of this patent

UNITED STATES PATENTS

| | | |
|---|---|---|
| 2,299,565 | Colburn | Oct. 20, 1942 |
| 2,315,079 | Reeves | Mar. 30, 1943 |
| 2,404,884 | Pieper | July 30, 1946 |
| 2,785,019 | Caubet | Mar. 12, 1957 |
| 2,791,471 | Clancey | May 7, 1957 |
| 2,920,923 | Wasp | Jan. 12, 1960 |

FOREIGN PATENTS

| | | |
|---|---|---|
| 267,106 | Great Britain | June 23, 1927 |
| 92,541 | Sweden | June 8, 1938 |